Nov. 4, 1930.  W. W. LASKER  1,780,621
TABULATING MACHINE
Filed Dec. 6, 1929   4 Sheets-Sheet 1

INVENTOR
William W. Lasker
BY Robert H. Strother
ATTORNEY

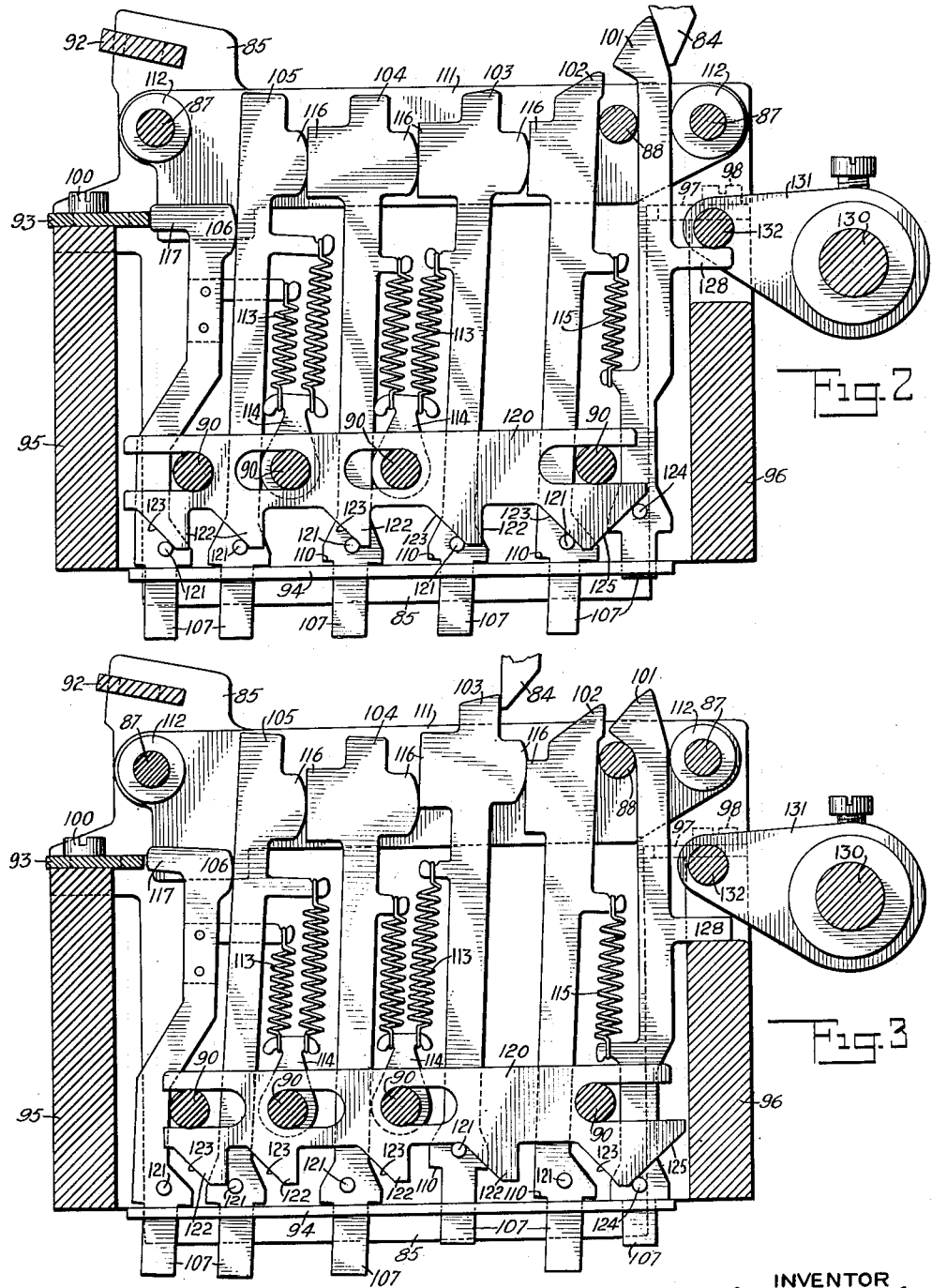

Nov. 4, 1930.    W. W. LASKER    1,780,621
TABULATING MACHINE
Filed Dec. 6, 1929    4 Sheets-Sheet 3

INVENTOR
William W. Lasker
BY Robert H. Strother
ATTORNEY

Nov. 4, 1930.                W. W. LASKER                1,780,621
                           TABULATING MACHINE
                         Filed Dec. 6, 1929        4 Sheets-Sheet 4

Fig.6

INVENTOR
William W. Lasker
BY Robert H. Strother
ATTORNEY

Patented Nov. 4, 1930

1,780,621

UNITED STATES PATENT OFFICE

WILLIAM W. LASKER, OF BROOKLYN, NEW YORK, ASSIGNOR TO REMINGTON RAND INCORPORATED, OF NEW YORK, N. Y., A CORPORATION OF DELAWARE

TABULATING MACHINE

Application filed December 6, 1929. Serial No. 412,262.

This invention relates to improvements in automatic accounting and printing machines which operate under the control of perforated record cards, the main object being to adapt such machines so that an increased amount of data carried by the perforated card record may be analyzed and tabulated in the usual way, without increasing the size of the analyzing portion of accounting machines that hitherto have tabulated data from records of more limited capacity.

Another object of the invention is to adapt the record card to such increased capacity without increasing the size of the card and without changing the size of the perforations now common in records bearing less data.

Another object of the invention is to provide for the use of the perforations in the record card so that the increase in data capacity does not affect the structural strength of such card and that the feeding qualities may not be impaired.

Still another object of the invention is to reduce the number of parts and simplify the construction of the printing, accounting and tabulating machines even though the capacity of same be increased.

A still further object is to provide a stop arrangement for adding or accounting machines having a plurality of longitudinally and laterally movable stops one of which has a projection on it to normally prevent later movement of said stops and movable to permit movement of the stops so that each stop may control more than one position of the accounting sectors in the accounting machine.

Another object is to provide a stop arrangement for adding or accounting machines, each of which has a lateral abutment thereon to position the stops one against the other in more than one lateral position, thereby permitting the use of a fewer number of stops.

These and other features and advantages will be apparent by reference to the following specification, and claims and the appended drawings. In said drawings, Fig. 1 is a sectional elevation of the well-known Powers perforated card controlled tabulating machine modified according to my invention.

Fig. 2 is an enlarged sectional elevation showing the differential stops of the invention in normal position.

Fig. 3 is a view similar to Fig. 2, but showing the zero stop lowered and the three-four numerical stop raised to control the differential action at the 3 position.

Fig. 6 illustrates my increased capacity card, that controls my novel mechanism.

The patents to Powers No. 1,245,502 and No. 1,245,504 of November 6, 1917, illustrate and describe an automatic card controlled tabulating machine of the type to which for illustrative purposes, I have shown my invention applied. The drawings are intended to represent a Powers tabulator of the kind now in extensive use, but modified according to my invention.

Figure 1:
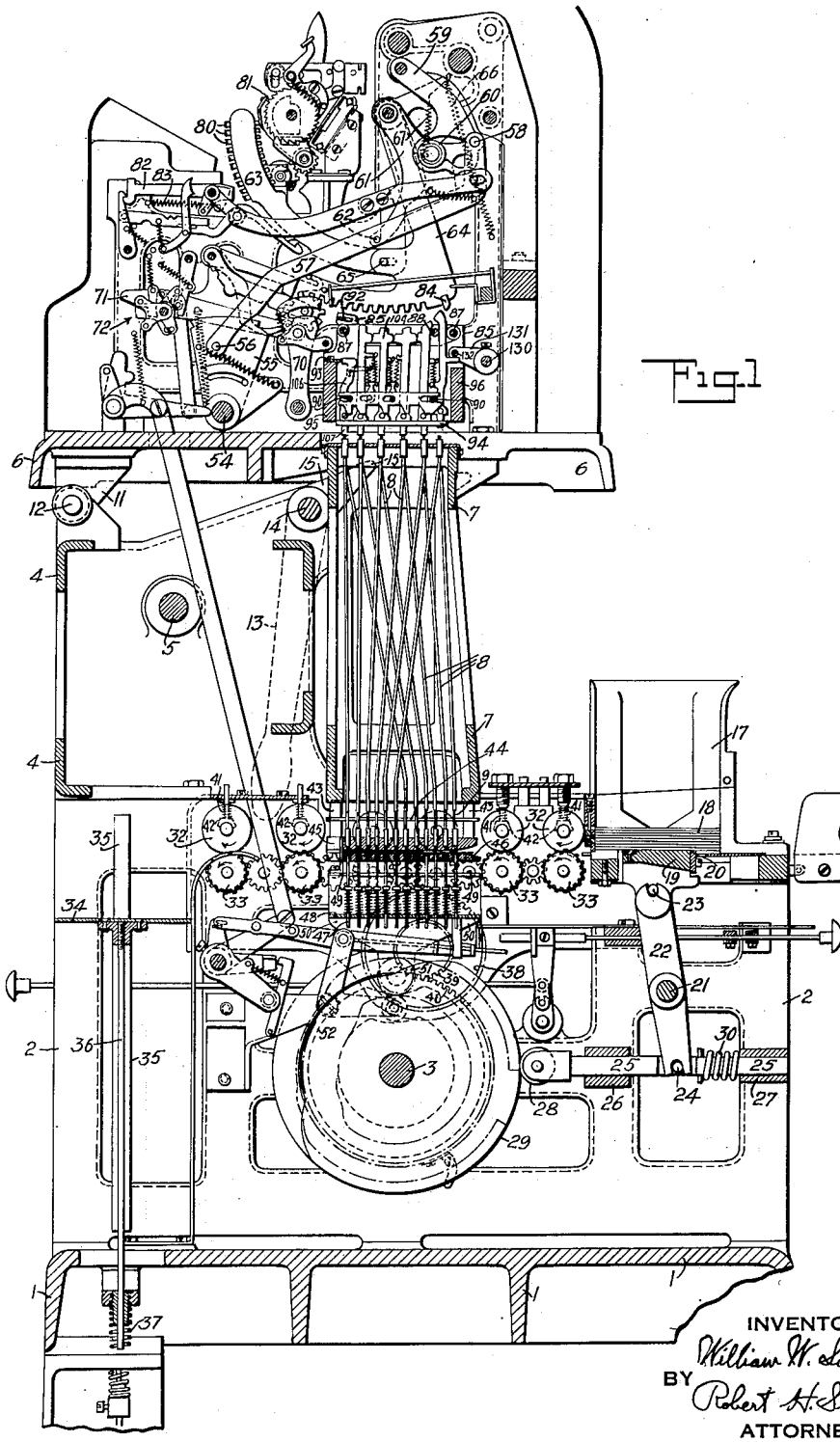

As shown in Fig. 1, a base plate 1 supports the side frames 2 which carry between them the main operating shaft 3 and connections, also the card feed and record sensing mechanism.

Surmounted on the frames 2 and extending part way across are the spacer frames 4 which in addition to carrying the bearings for the auxiliary operating shaft 5, serve also to support the base 6 of the adding and printing mechanisms. The shaft 5 is connected to shaft 3 by gears, not shown. The space between the upper base 6 and the side-frames 2 is occupied by the connection box 7 which carries in self-contained form a system of connection rods 8 which convey motion from certain plungers 9 to the differential stops for the adding and printing sectors.

The base 6 has lugs 11 by which it is hinged at 12 to the spacer frames 4. A handle 13, shown by dotted lines, is fast on a rock shaft 14 having at its ends cam arms 15 acting on the underside of the base 6. By pulling this handle the base 6 may be tilted up to permit the removal of one connection box 7 and substitution of another in order to change the set-up of the machine.

All of the machine below the connection box 7 is shown in ordinary Powers construction. The cards 18 are fed from the magazine 17 by picker 19, 20 reciprocated as usual by means including shaft 21 carrying lever 22 which is connected at 23 with the picker and at 24 with a rod 25 which slides in frame members 26, 27. Said rod carries the follower 28 of a cam 29 mounted on the main shaft 3, said roller being pressed against the cam by a compression spring 30. The cards ejected from the magazine are controlled in the usual way by feed rolls 32 and 33 which finally deliver them to a hopper including a receiving plate 34 slidable vertically on slides 35 and supported by the usual rod 36 and spring 37. The feed rolls 33 are driven by the usual train of gearing including a gear 38 rigid with a pinion 39 which meshes with a gear 40 on the drive shaft 3. The upper rolls 32 are frictionally driven by contact created through the compression springs 41 bearing upon the yieldable straddle blocks 42, which together with vertical slots in the frame 2 constitute the controls for the shafts supporting the rolls 32.

Bridge members 43 fixedly mounted between the frames 2, support the guide plates 44, 45 and 46, which constitute the sensing or analyzing chamber for a card that is fed between the upper plate 45 and the lower plate 46. Plates 44 and 45 carry the loosely vertically disposed plungers 9 that are shouldered to limit their downward movement by contact with coacting shoulders in the plate 45. The lowest points of the plungers 9 normally are flush with the under face of plate 45 so as to leave the space between the plates 45 and 46 clear for the passage of a card. Opposing the plungers 9, and in the lower plate 46 are a series of holes that receive the upper ends of a series of spring retained plungers 47 each having a shoulder collar between which and a supporting plate 48 is a compression spring. The plungers 47 are mounted between the plate 48 and an upper plate 49 both of which are mounted in a frame 50 that is arranged to be vertically reciprocated by rolls 51 thereon, riding in box cams 52 which are secured to the main operating shaft 3. As the shaft 3 rotates the frame 50, with the plungers 47, reciprocates so that the upper ends of the plungers, which normally stand below the upper surface of plate 46 so as not to obstruct the passage of a card, pass upwards into contact with their opposed plungers 9 to thereby raise the connecting rods 8. As usual in the Powers tabulator, the plungers 9 are arranged in forty-five rows or columns of twelve plungers each.

The adding and printing mechanism supported on the base 6, may be of the usual Powers construction, and it is so shown in the drawing. The operating shaft 54 is arranged to be rocked in bearings suitably mounted on base 6, the rocking motion being imparted thereto by mechanism not shown consisting of a driving arm horizontally fixed to shaft 54, a crank-arm fixed on shaft 5, and a pitman connecting the two so that the rotating of shaft 5 conveys a rocking action to shaft 54. Shaft 5 is driven from shaft 3 by the usual gearing not shown. The adding and printing mechanism consists of a series of units disposed across the machine and for each unit a cam 55 is mounted on the shaft 54, each cam having a stud 56 which serves to drive a bent pitman 57 whose upper end connects with a pin 58 attached to one arm of a cam lever 59 which by means of follower roller 60 oscillates a lever 61 constituting one element of a bail which also includes a bail rod 62 which lies in front of and contacts the edges of the type carriers 63. Assembled along side each type carrier is an actuating gear segment or rack sector 64 connected therewith by the usual pin-and-slot connection 65 for transfer purposes. The type sectors 63 are driven in one direction by springs 66 and springs 67 are tensioned between said type sectors, or arms thereof, and the gear segments 64, all as usual.

The register wheels 68 are moved into and out of gear with the racks 64 by the cam arms 70, which are oscillated at proper times by a link 71, which is operated by the cam sectors 55 through the usual mechanism designated generally by numeral 72.

The type bars 63 have types 80 for imprinting on the platen 81. The imprint is made by the hammers 82 being released to strike the type under the influence of springs 83. In the operation of addition the accumulator pinions 68 are first thrown out of mesh with the gear segments 64. The bail rod 62 is retracted allowing the springs 66 to move the type sectors 63 and gear sectors 64 along until these are arrested, after which the rod 62 may continue to its limit of movement. While the sectors 63 and 64 are thus in their arrested positions, the hammers 82 are released to cause an imprint of the types now brought to printing position. Then pinions 68 are thrown into mesh with the segmental racks 64, and the bail rod 62 returns sectors 63 and 64 to normal, racks 64 turning the register wheels 68 to add in the value represented by the movement of the respective sector racks 64. Each of said sectors is provided with a lug 84 for co-operation with the settable numeral stops to be hereinafter described.

In order to control the movement of the several sector racks 64 to correspond to values represented by perforations in the respective columns of the record cards, a downward extending lug 84 is provided on each segmental gear 64.

The settable numeral stops for co-operation with the lugs 84 are preferably arranged in groups or sets, one corresponding to each of the adding and printing units as is usual in these machines. In the present instance, each set of stops is mounted in a frame and said frame and its stops may be described as a stop unit, there being one of these units for each adding and printing unit.

One of these units is illustrated in Figs. 2, 3, 4 and 5. The frame work of each unit includes side plates 85 and 86 rigidly connected together chiefly by several cross rods including two rods 87 in the upper part of the frame, another rod 88 in the upper part of the frame and four rods 90 in the lower part of the frame. Each of these rods may be reduced at its ends to make shoulders, and the plates 85 and 86 are clamped against said shoulders by nuts 91, thus binding the parts into a rigid frame.

The framing also includes two cross bars 92 and 93 each shouldered at its ends and having tenons that fit into mortises or slots in the plates 85 and 86. It also includes a base plate 94 which also has tenons fitting suitable openings in the side plates 85 and 86.

Two bars 95 and 96 extend transversely across the machine and are supported by the end pieces 73 of the machine frame. The plates 85 and 86 have ears 97 bent off therefrom and lying on top of the bar 96 to which they are secured by screws 98. The cross bar 93 lies on top of the bar 95 to which it is secured by screws 100. The unit can be detached from the machine by removing the screws 98 and 100.

For each denomination, that is to say, underlying each of the rack sectors 64, there are provided five stops 101, 102, 103, 104 and 105, and a sixth device 106 which may also be called a stop, although it does not extend into the path of nor directly co-operate with the stop lug 84 on the sector. Each of these stops has a limited up and down sliding movement, each of them having its lower part in the nature of a tongue 107, said tongues being guided in holes 108 punched in the base plate 94. These holes are rectangular to agree with the cross section of the tongues 107, and they are arranged in rows of six each; ten such rows being shown in Fig. 5. The downward motion of each stop is limited by shoulders 110.

The stops are guided at their upper ends against displacement in a transverse direction by a series of bars 111 strung along the upper frame rods 89 and spaced apart by washers 112.

The stops 103—106 are normally held down against the plate 94, not only by their weight, but also by springs 113 connected to the stops and to anchor pieces 114 strung on the rods 90. The stops 101 and 102 are, however, both influenced by a single spring 115 tending to pull the stop 102 downward and the zero stop 101 upward.

The stops normally occupy the position shown in Fig. 2, the zero stop 101 in its upper position. The upper ends of the stops 102, 103, 104 and 105 are in such position that if the stop 102 were to be projected upward and the stop 101 pulled downward the rack sector would be free to move one space, that is to say, a distance equal to the distance from one tooth of the rack to the next. If the stop 103 be projected upward it will allow the rack 64 to move three spaces, 104 allows it to move five spaces, and 105 seven spaces.

Figure 4:
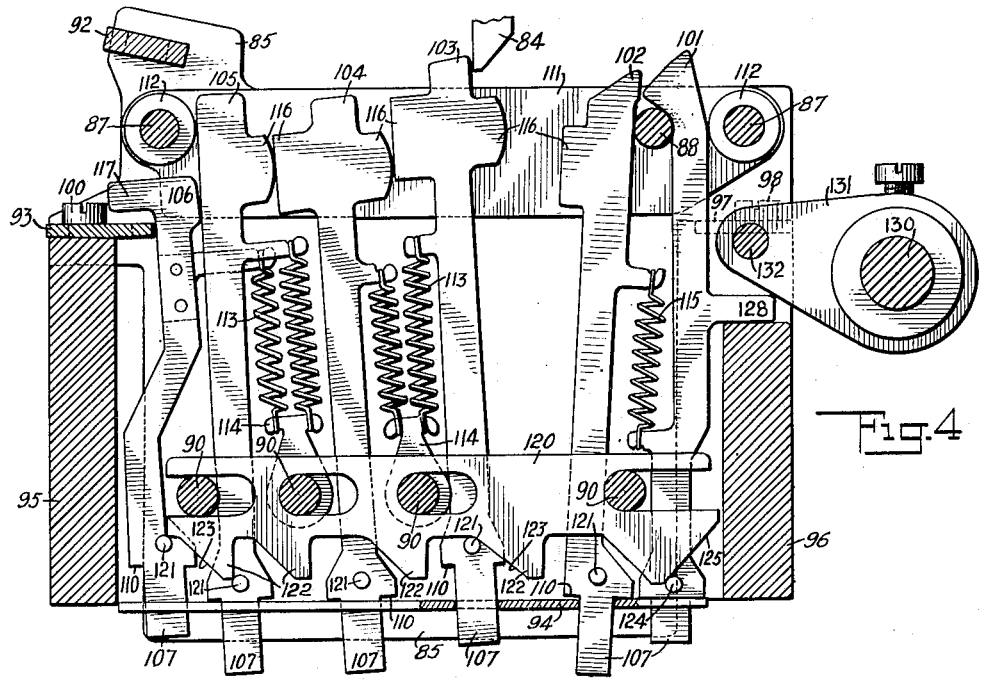
Fig. 4 is similar to Fig. 3 having the zero stop lowered and the three-four numerical stop raised, but with a special device also raised, whereby the three-four numerical stop controls the differential action at the 4 position.
Figure 5:
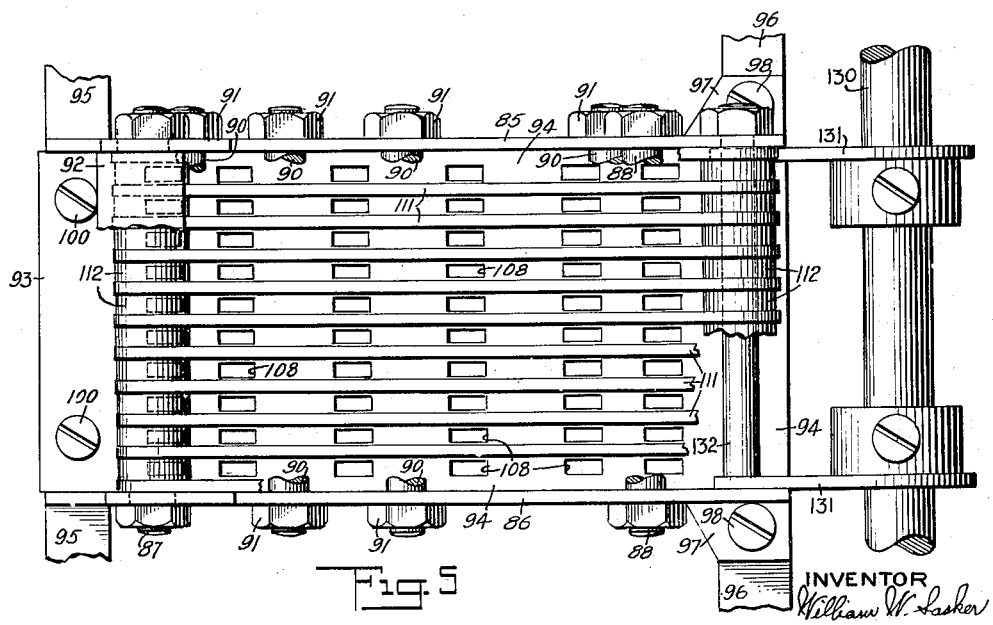
Fig. 5 is a fragmentary plan view showing the columnar guides and bearing plates for the numerical stops, but with the numerical stops removed.

The zero stop 101 is guided front and back by the frame rod 88 and by one of the washers 112. The stops 102, 103, 104 and 105 are so guided that they may be projected directly upward into the path of the lug 84, and so that in one instance a projected stop will be held rigid to arrest the lug 84, and in another instance it may yield to the pressure of said lug and allow the latter and the rack 64 to move one tooth-space further than in the first said instance. The means for effecting this mode of operation may be varied. In the preferred form shown in the drawings, the projectable stops are made near their upper ends with extensions or lugs 116 which normally contact as shown in Fig. 2 and the stop 106 is made with an arm or projection 117 which normally rests against the edge of the bar 93, the stop 102 being guided by the rod 88. In Fig. 3, the stop 103 is shown projected upward and arresting the lug 84. The pressure of said lug is communicated through the lugs 116 from one stop to another and is finally taken by the projection 117 resting against the bar 93. This is the setting to add and print 3. In Fig. 4, the stop 103 is shown projected and arresting the lug 84, and at the same time the stop 106 is also elevated to bring the projection 117 above the bar 93. The pressure of the lug 84 swings stops 103, 104, 105 and 106 leftward until stop 106 is arrested by the bar 93 as shown. The motion thus allowed to the stops is just equal to one tooth space of the rack 64. Elevating the stop 106 in conjunction with any one of the stops 102, 103, 104 and 105 has, therefore, the effect of adding one to the value of the projected stop.

The three left hand springs 113 as viewed in the drawings, are connected to fingers projecting rightward from the stops and the finger on stop 106 is longer than the rest. The tension of these springs therefore has a tendency to rock the stops rightward which assists in drawing the projection 117 off of the bar 93 when stop 106 is returned from the position shown in Fig. 4 to normal position.

The scheme of addition will be apparent from what has been said. When the stop 101 is elevated as shown in Fig. 2 the rack can not move. If one of the stops 102, 103, 104 and 105 is elevated alone the rack can move 1, 3, 5 or 7 spaces as the case may be. If one of those stops is elevated in conjunction with the stops 106 then the rack can move 2, 4, 6 or 8 steps as the case may be. The fixed bar 93 serves as a 9 stop.

Means are provided for pulling down the zero stop 101 whenever any of the other five stops is elevated. The form of means shown in the drawings comprises cam bars 120 slidably mounted on the lower frame rods 90 by means of slots, one of these bars being provided for each row of stops. Each of the settable stops has a pin or stud 121 projecting therefrom into the plane of the cam bar 120. Said cam bar is formed with a series of downwardly projecting teeth 122, each having an inclined edge 123 adapted to be operated by one of the pins 121 so as to force the cam bar toward the right in Fig. 2 when any one of the stops is elevated. The zero stop 101 also has a similar pin 124 which co-operates with an inclined edge 125 on the cam bar 120, this edge inclining in the opposite direction from the inclines 123. If, with the standing as shown in Fig. 2, any one of the stops 102—106 be pushed upward the bar 120 will be moved to the right and acting on the pin 124 will pull the zero stop down against the tension of its spring 115 as shown in Fig. 4.

Elevating stop 106 alone has the effect of withdrawing stop 101, so that the lug 84 is free to move to its nine position where it is arrested by bar 93. The pins 121 and bar 120 serve also to limit the upward motion of the stops.

The tongues 107 of the stops 102—106 stand in position as shown in Fig. 1 to be operated by the rods 8 which are pushed upward in the act of analyzing a card, but the tongue 107 of the zero stop is shortened so that it can not be acted on by these push rods 8. In Fig. 1, I have shown rods 8 in the zero position, but these may be omitted, or they may be used for other purposes, such, for example, as for controlling in some way the operation of the machine.

When any stops have been raised by the rods 8 they will be returned to their normal position by their springs when the rods 8 return to their normal position, and the zero stop 101 will be elevated by its spring 115 to its normal position, and its pin 124 will restore the bar 120 to normal.

It will be seen that where no hole is punched in a certain row on the card the rack 64 for that row will register zero.

In Fig. 6 I have shown a card that is designed to be used in this machine. It may be of the same dimension as the cards already in use, and the locations or points at which holes may be punched in the card may be the same as heretofore. The card shown is like those at present in use in the Powers machine, having the points or locations disposed in 45 rows of 12 each.

From what has been said above it is apparent that to control each rack 64 by my stop mechanism only five points in each row on the card are needed. I have shown the card divided into two equal parts by a longitudinal line 126, but this may be only an imaginary line. I have also shown each location, or points at which a hole may be punched designated by the numerals 0, 1, 2, 3, 4, 5, but these designations do not indicate values but are only for facility of explanation. The up and down rows of points may for distinction be called denominational rows, and it will be perceived that there are two more than enough points in each row to control two denominations of the machine, and according to the present arrangement, which, however, may be modified, I use the upper half of the card to control some denominations and the lower half to control other denominations. In Fig. 1, I have shown the left hand half of the wires 8 that appear in that view leading to one denomination of stops 102—106, and the right hand half of the rods 8 bent so as to come up behind the first set, and these control the next succeeding denomination. With this arrangement of the wires 8, a punch at the point 1 would cause the machine to register 1, a punch at the point 2 would cause the machine to register 3, one at the point 3 would cause it to register 5, one at the point 4 would cause it to register 7 and one at the point 5 would cause it to register 9.

The scheme is also such that if two holes be punched in locations 1 and 5, the machine will register 2; if in points 2 and 5, the machine will register 4; if in points 3 and 5, the machine will register 6 and if in points 4 and 5, the machine will register 8. The values of punchings are indicated in the drawing at the left of the card. The same thing occurs whether holes be punched in the upper or the lower half of the card, but these holes control other denominations of the adding and printing mechanism. It will be seen that every other denomination is controlled from the upper half of the card, the alternate ones being controlled from the lower half of the card. This is indicated by the numerals in Fig. 6 designated by reference numeral 127. The upper half of the first row at the left controls the first sector 64, the lower half of the same row controls the second sector; the upper half of the next row controls the third sector, the lower half of that row controls the fourth sector, and so on. I have shown the card punched, beginning at column 41, to represent the number, 1,203,456,789. The ten digits of this number occupy five of the forty-five rows of points on the card. The 45 rows of holes are, therefore, capable of controlling 90 sectors 64 which is double the number heretofore controlled by the same size card and sensing mechanism in the Powers machine.

The points on the card marked "0" are not needed for controlling the adding and printing sectors and these points may be used for other purposes.

Each of the zero stops 101 is made with a lug or finger 128. The machine contains a shaft 130 which is rocked when it is desired to take a total, and on this shaft there is mounted a series of arms 131, two such arms for each of the stop units, and said two arms connected by a bail rod 132 which overlies the fingers 128. The construction is such that when the machine is set to take a total all of the zero stops are drawn down against the tension of their springs 115 and without raising any other stop.

I would call attention to the extreme simplicity of the means whereby the capacity of the tabulator is doubled by my invention. Except for the fact that in the upper part of the machine a larger number of printing and adding sectors 63 and 64 are provided, the only changes in the machine consist in the substitution of my improved stop units and in the corresponding changes in the disposition of the rods 8. All of the rest of the machine may be constructed exactly as heretofore. In fact, my invention may be readily incorporated into machines already constructed and in use.

In most tabulators of the class to which my invention relates the connections from the card sensing mechanism to the printing and adding mechanism can be disposed in various ways. In the Powers machine this is done by suitably bending the rods 8 and leading them from holes in the bottom plate of the box 7 to whatever points are desired in the top plate of said box. By merely bending these rods or other connections it would be possible to use the upper half of the card shown in Fig. 6 for certain units of the tabulating mechanism and the lower half for other units. In that event the columns designated in the drawing 1, 3, 5, 7, etc., would become columns 1, 2, 3, 4, etc., the wires 8 leading to consecutive denominations of the stop mechanism. The lower half of the card could be used to control other stop units disposed laterally from those in the upper half of the card or one set of tabulating units could be arranged in front of another. In short, the particular manner of controlling the adding and printing mechanism from a card such as shown in Fig. 6 can be varied considerably.

Fig. 1 shows some of the parts of the automatic total taking mechanism which I have designated by reference numeral 133. This total taking mechanism can be used in conjunction with my invention, but it forms no part of it.

Various changes other than those particularly mentioned may be made without departing from my invention.

What I claim as new and desire to secure by Letters Patent, is:—

1. The combination with tabulating mechanism of means for controlling said mechanism from a record card having record spaces arranged in denominational rows, said means including means whereby a part of each row is employed for controlling one denomination and another part of the same row is used for controlling another denomination of the same unit.

2. The combination with tabulating mechanism, including a plurality of registering units each having columns of stops, means for controlling said mechanism from a record card having columns of control points, means for feeding said card to said controlling means in a definite relation thereto, said columns in said card being arranged substantially parallel to said columns of stops on said registering units during feeding and each column in said card being arranged to control more than one column of stops in the same registering unit.

3. In a tabulator, a registering mechanism having a plurality of stops and a differential device controlled thereby, said stops being movable longitudinally into operative position and laterally in the direction of movement of said differential device, and a device movable into two positions, in one of which it prevents the lateral movement of said stops.

4. In a tabulator, a registering mechanism having a plurality of stops, said stops being movable longitudinally and laterally, analyzing means having a plurality of analyzing members, and means controlled by one of said analyzing members for determining whether the stops shall be moved laterally or not.

5. In a tabulator, registering mechanism having a plurality of stops arranged in columns, said stops being movable longitudinally and laterally, and analyzing means having a plurality of analyzing members one for each stop for controlling longitudinal movement thereof, and having also analyzing members one for each column of stops for controlling lateral movement of the stops of that column.

6. In registering mechanism, a plurality of stops, each having one end slidably guided in a slot and another end loosely held between guide strips in such a way as to be movable through a limited movement, and one of said stops being provided with means for normally preventing said movement, said movement occurring when said stop is actuated out of normal position.

7. In registering mechanism, the combination of a plurality of movable rack sectors for controlling the position of printing type, a plurality of stops each having one end guided in a slot and another end loosely held between guide strips in such a way as to be freely movable through a limited movement in a direction parallel to the movement of said rack sectors and one of said stops being provided with means for preventing such movement in one of its longitudinal positions but not in the other.

8. In a tabulator, a registering mechanism having a plurality of stops each having one end guided in a slot and another end loosely held between guide strips in such a way as to be freely movable through a limited movement, a plurality of differential members movable in the same direction as said limited movement of said stops, an analyzing arrangement having analyzing elements, and connections from said analyzing elements to said stops for moving them to effective position, one of said stops normally preventing movement of said stops in the direction of said limited movement and actuatable by certain of said connections to permit said movement.

9. In a tabulator. registering mechanism having a plurality of stops, one of which is slidably guided in bearings at both ends and others of which are slidably guided in bearings at one end only, the other ends each being free to move in suitable guides in a lateral direction, lateral abutments on each of said other stops serving as bearing surfaces for locating their actuated positions and means controlled by said analyzer for changing said actuated positions by varying the positions in which said abutments come to rest.

10. In a tabulator, an analyzer having a number of operating connections, a registering mechanism having a plurality of stops operated by said connections. one of which is slidable in close fitting bearings at both ends and others of which are slidable in close fitting bearings at one end only, the other ends each being free to move in suitable guides in a lateral direction, lateral abutments on each of said other stops serving as bearing surfaces between each other, a fixed bearing surface against which one of said stops fits and a shoulder on the last mentioned stop for permitting movement of said other stops when said last mentioned stop is moved in a longitudinal direction beyond said fixed bearing surface.

11. In a stop mechanism, a plurality of longitudinally and laterally movable stops, a projection on one of said stops for normally preventing lateral movement of the others of said stops, said one stop being movable longitudinally to permit said lateral movement of said other stops, and tensioned means for normally restraining said stops against said lateral movement.

12. In a stop mechanism, a plurality of longitudinally movable stops having more than one lateral position, a rack having a lug adapted to be stopped by said stops, said stops in normal longitudinally moved position adapted to stop said lug in alternate positions of said rack and when moved both longitudinally and laterally to stop said rack in positions interposed between said alternate positions.

13. In a tabulator, registering mechanism having a plurality of stops movable longitudinally and laterally, analyzing mechanism having a plurality of analyzing members, each stop being controlled as to its longitudinal position by one of said analyzing members and another of said analyzing members arranged to control the lateral position of said stops.

14. In a tabulator, registering mechanism having a plurality of stops arranged in columns, said stops being movable longitudinally and laterally, analyzing means having analyzing members arranged in columns, one such member for each stop for controlling longitudinal movement thereof and having also analyzing members, one for each column of stops for controlling lateral movement of the stops of that column, one column of analyzing members controlling a plurality of columns of stops.

Signed at Brooklyn, in the county of Kings and State of New York this 2d day of December, A. D. 1929.

WILLIAM W. LASKER.